United States Patent

Durkee

[15] 3,689,886

[45] Sept. 5, 1972

[54] CONTROL SYSTEM HAVING TRANSMITTER-RECEIVER SETS FOR OPERATING FUNCTIONAL DEVICE OVER POWER LINES

[72] Inventor: John E. Durkee, Ft. Atkinson, Wis.

[73] Assignee: Thomas Industries Inc., Ft. Atkinson, Wis.

[22] Filed: Feb. 9, 1971

[21] Appl. No.: 113,954

[52] U.S. Cl.....................................340/163, 340/310

[51] Int. Cl...............................................H04q 11/04

[58] Field of Search...............340/163, 310, 216, 171

[56] References Cited

UNITED STATES PATENTS

| | | | |
|---|---|---|---|
| 3,211,111 | 10/1965 | Morley | 340/310 X |
| 3,439,338 | 4/1969 | Perry | 340/310 X |
| 3,451,052 | 6/1969 | Anderson et al. | 340/171 X |
| 3,458,657 | 7/1969 | Lester et al. | 340/171 X |
| 3,488,517 | 1/1970 | Cowan et al. | 340/163 X |
| 3,445,814 | 5/1969 | Spalti | 340/151 |

*Primary Examiner*—Donald J. Yusko

*Attorney*—John A. Dienner, Arthur C. Johnson, John A. Dienner, Jr., C. Lyman Emrich, Bruno J. Verbeck, Arthur J. Wagner, F. Vern LaHart, George F. Lee, Raymond C. Nordhaus and Richard L. Wood

[57] ABSTRACT

A control system for operating functional devices over an AC power line which includes a transmitter for each functional device connected to the AC power line for generating coded signals for transmission over the power line, and a receiver for each functional device connected to the power line and responsive to the coded signals transmitted over the power line by the corresponding transmitter to effect the connection of an associated functional device to the power line to receive operating power therefrom.

35 Claims, 29 Drawing Figures

INVENTOR
JOHN E. DURKEE

BY Johnson Dienner Emrich Verbeck & Wagner
ATTYS.

INVENTOR
JOHN E. DURKEE

BY Johnson, Dienner, Emrich & Wagner
ATTYS.

INVENTOR
JOHN E. DURKEE

BY Johnson, Dienner, Emrich, Verbeck & Wagner

ATTYS.

INVENTOR
JOHN E. DURKEE

BY Johnson Dienner Emrich Verbeck & Wagner

ATTYS.

INVENTOR
JOHN E. DURKEE

BY Johnson Dienner Emrich Wagner ATTYS

CONTROL SYSTEM HAVING TRANSMITTER-RECEIVER SETS FOR OPERATING FUNCTIONAL DEVICE OVER POWER LINES

BACKGROUND OF THE INVENTION

1. Field of the Invention

This invention relates to electrical power distribution systems, and, more particularly, to a control system having transmitter-receiver sets for operating functional devices over AC power lines.

2. Description of the Prior Art

In electrical wiring layouts presently employed, the circuits which connect electrically powered functional devices, such as lights, motors, appliances or other equipment, to conductors which carry electrical current for operating the devices usually include an actuating switch for permitting the devices to be turned on and off. Such circuits and the switches which control the functional devices may be considered to be permanently wired because the locations of the functional devices and the actuate switches are determined before the installation of the wiring, and the electrical conductors are then routed to the locations to be hooked up to the functional devices and to the actuating switches associated therewith. Furthermore, the conductors are usually encased in conduit and generally run between walls, in ceilings, or in floors to provide the required electrical circuit from each functional device to a switch for turning on the device. Accordingly, once installed, such wiring is difficult to repair or reroute.

To permit control of a functional device by an associated activate switch, the device must be connected to a power line over a series circuit path which includes the activate switch which controls the connection and disconnection of power to the device. An individual series circuit, including the functional device and the activate switch must be provided for each functional device to be controlled.

The need to interpose the activate switch between the functional device and the power line which supplies power to operate the functional device while yet making the activate switch convenient to the user, frequently complicates the wiring layout and makes both the installation of the wiring and the hook-up of the devices and switches to the wires difficult.

The large number of switch-controlled functional devices and switches in even a single residential installation results in an individual circuit substantial monetary outlay.

It has been determined that the average length of time required to connect a functional device to its activate switch is approximately 0.6 hour. To obtain a measure of the expense involved in providing electrical wiring, the number of such circuits required must be multiplied by the time factor and by another factor which relates the cost per hour of employing an electrician to install the wiring. Additions to or changes in individual circuits of original wiring layouts generally cost more than the original layouts for a number of reasons but mainly because of the lack of accessibility to the circuits which generally run between walls, or in ceilings or floors. Thus, once a wiring installation has been completed, parties will frequently suffer with the inconvenience of a particular layout rathern than incur the large cost involved in rewiring of the system.

In most commercial applications, the builder must anticipate a higher instance of change in the electrical layout and as a result will frequently install a system of wiring ducts to permit the routing of wires in walls, ceilings, or beneath floors whereby wires can be "-fished" through or pulled out to permit changes in the routing of the wires. While such installation permits modification of existing wiring, the cost of such modifications is generally high because of the need of using specially trained personnel to reroute the wires, and because of the time involved in determining which wires need to be removed or relocated. These problems are of particular concern when the distance between the functional device and the controlling switch is long and modifications must be made to circuits which extend over a considerable distance.

From the foregoing, it is apparent that by reason of the limited accessibility to the electrical wiring of existing installations, modifications or expansion are difficult and correspondingly costly.

SUMMARY OF THE INVENTION

The present invention provides a control system for operating a plurality of functional devices over AC power lines. Each functional device is controlled by a transmitter-receiver set associated with the device. When the transmitter associated with a device is activated through the operation of an associated activate switch, the transmitter is effective to generate unique coded signals for transmission over the power line to the corresponding receiver to enable the receiver which effects the connection of the associated functional device to the power line for operation.

In the control system of the present invention, the activate switches for individually controlling the operation of functional devices serve to energize the transmitters to generate the receiver enabling signals for transmission over the power line to the receivers. However, the activate switches themselves do not complete a circuit between the power line and an associated functional device. Thus, for purposes of installation, each activate switch is connected to a power line through a transmitter and each functional device is separately connected to the power line through a receiver. Since such connections are independent of one another for each transmitter-receiver set, the location of the activate switch relative to the functional device becomes a matter of convenience and the need for the "standard" series circuit including an activate switch for connecting a functional device to a power line is eliminated.

In the control system provided by the present invention, each functional device is connected to the power line by an individual receiver and each actuating switch is connected to a power line by an individual transmitter. The power line provides operating power for the transmitters and the receivers and further acts as a conducting medium for the receiver enabling signals.

Since the functional devices and the activate switches for controlling the devices are connectable to the power line over separate circuits, the initial installations as well as subsequent modifications of electrical power distribution systems which use the transmitter-receiver set control technique of the present invention are simpler than wiring systems presently employed.

Moreover, in accordance with the teachings of the present invention, since the installation of the activate switch is done independently of the installation of the functional device controlled by the switch, the location of the activate switch relative to the functional device it controls does not complicate the wiring procedure as in conventional systems. As a typical installation, power is input to the building over a main service and a master circuit breaker box. Branch circuits are routed throughout the building over wiring located in walls, ceilings or floors throughout the building to provide power at places in the building at which functional devices, such as lights, electrical outlets, electrical appliances, etc., may be located.

Each functional device is connected through an individual receiver to one of the branch power lines by a pair of conductors which are run from the location of the functional device to the closest branch line. An activate switch for controlling the functional device is similarly connected through an individual transmitter to the branch line nearest the desired location for the switch.

The coded enable signals generated by the transmitter when operated will be conducted over all of the branch lines to all of the receivers connected to the branch lines. Of course, only the receiver adapted to be responsive to its corresponding transmitter will be enabled by the signals.

Functional devices can be added to an existing system, or such devices can be moved from one location to another with little difficulty. To add a device to a system, the device is connected through a receiver to the closest branch power line. The receiver may be adapted to be responsive to enabling signals of an existing transmitter which controls an existing functional device, or a separate activate switch can be connected to a branch power line through an additional transmitter.

To move a device merely requires the disconnection of the device and its associated receiver from its original location and the reconnection at a new location. The activate switch and associated transmitter for the relocated device can remain at its original location or can also be relocated and connected through its transmitter to a different branch line. In either case, the activate switch will be effective to control the relocated functional device.

Alternately, activate switches can be added to an existing system to provide additional means for controlling certain functional devices, or existing actuate switches can be moved to a different location by disconnecting the switch and its associated transmitter and reconnecting the switch and the transmitter at the new location.

The control of a given functional device can also be changed without making changes in electrical wiring. The operation of each functional device is controlled by a separate transmitter-receiver set, by which unique coded signals are transmitted to the receiver to effect operation of the functional device. A transmitter or a receiver of a set can be "retuned" to generate or detect a different coded signal. Thus, a transmitter of a first transmitter-receiver set can be "retuned" to generate enabling signals detectable by a receiver of a second transmitter-receiver set. Consequently, the first transmitter when operated will effect the connection of the functional device associated with the second transmitter receiver set.

Alternately, the receiver of the first set can be "retuned" to detect enabling signals generated by the transmitter of the second set. In the latter condition the activation of the transmitter of the second set will effect operation of both functional devices.

Inasmuch as the control function of the system provided by the present invention is based on the transmission of enabling signals over a power line to effect operation of a functional device it is readily apparent that in an existing wiring layout every electrical outlet, such as for example the available wall outlet in a room, may serve as a receptor for a functional device or an activate switch. A functional device connected through a receiver to a power line by being plugged into an outlet is controllable by any activate switch connected in the system through a transmitter plugged into an outlet which has the proper coding for enabling the receiver. Transmitter units including activate switches can be plugged into an electrical outlet permitting control of selected functional devices from any location in a building which has an electrical outlet.

Several transmitter units can be assembled together to form a master control panel which can be plugged into electrical outlets in different places in a building. For example, in a residential dwelling such a master control unit may be plugged into an electrical outlet in a bedroom at night letting residents turn lights on and off from a remote location such as the bedroom to frighten an intruder. By using such a master control panel, a number of different functional devices in different locations of the residence may be operated simultaneously.

In a commercial application, master control units may be conveniently located at sites selected by a watchman to improve his capability of selectively illuminating the premises he is guarding.

In accordance with a preferred embodiment of the invention, transmitter-receiver sets for effecting the operation of a plurality of functional devices over a power line are employed to permit control of the operation of the functional device by enable signals generated by the transmitter of a set and detected by the receiver of the set. Whenever a receiver is enabled in response to the detection of enabling signals, the receiver effects the connection of the functional device to the power line for operation by the power signals present on the power line.

The receiver enabling signals comprise tone bursts of selected frequencies which are superimposed on the power signals which serve as a carrier media for the tone bursts. The tone bursts are detectable by the receivers connected to the power line which carries the power signals. A particular frequency is assigned to each transmitter-receiver set.

To increase the number of coded enabling signals obtainable from a given group of frequencies, and to provide protection against noise transients which could be coupled to the power line, a time division technique is used to supplement the frequency coding of the enabling signals. Accordingly, each cycle of the power signal is electronically subdivided into a plurality of time slots, and each transmitter and receiver includes a synchronizing circuit for enabling the transmitter and the receiver during one of the time slots. Each transmitter-receiver set of the system is alloted a tone burst frequency and a time slot such that each set has a unique coding for the permitting selective operation of a functional device.

Each transmitter includes a tone generating circuit for generating tone bursts which are superimposed on the power signals, and a synchronizing circuit which generates an enable pulse for enabling the tone generating circuit during the time slot alloted to the transmitter. An activate switch associated with the transmitter is operable to energize the tone generating circuit, and the sync circuit is responsive to the power signals to enable the tone generating circuit whenever it is energized to generate tone bursts during the time slot alloted to the transmitter.

Each receiver includes a tone detecting circuit responsive to the tone bursts superimposed on the power signals which are of the frequency to which the receiver is tuned to control a drive circuit. The receiver also includes a synchronizing circuit responsive to the power signals providing an enable pulse for enabling the drive circuit during the time slot in which the corresponding transmitter is generating the enabling signals.

Whenever the drive circuit is enabled by the sync circuit, the tone detect circuitry is responsive to enabling signals of the frequency to which the detector is tuned to control the drive circuit effecting the connection of the functional device to the power line for operation.

The transmitter and receiver units can employ solid state integrated circuits to a large extent, and accordingly can be manufactured inexpensively and packaged as a small compact unit.

GENERAL DESCRIPTION

The control system is described in an embodiment in which the control of functional devices such as lights, appliances and other electrical equipments is effected through the use of a transmitter-receiver set associated with each functional device. Each transmitter unit generates a unique coded signal when activated for enabling a corresponding receiver which then effects the energization of an associated functional device.

Figure 1:
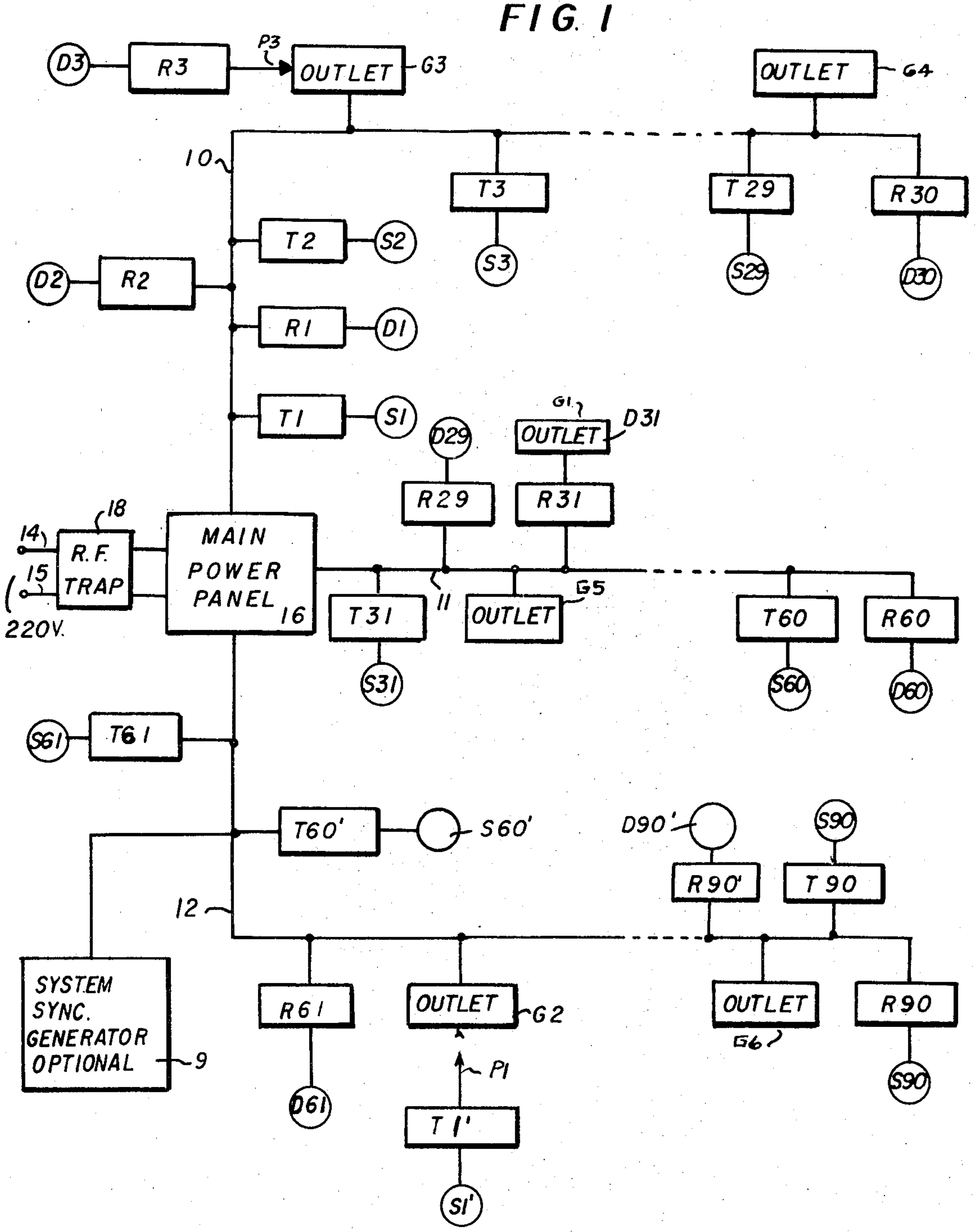
FIG. 1 is a block diagram of an exemplary installation of the power distribution system for use with the pairs of transmit receive units of the present invention in controlling operation of a plurality of functional devices.

Referring to FIG. 1, the exemplary power distribution system there shown includes a plurality of transmitter units and a corresponding number of receiver units. In the present illustration, 90 transmitter units, such as transmitter unit T1, and correspondingly receiver units, such as receiver unit R1, are connected to one of three power lines 10–12, for effecting operation of 90 functional devices, such as device D1 associated with transmitter-receiver pair T1, R1, over the power lines 10–12.

The power signals for operating the 90 functional devices are derived from a main line 14,15 which extends from a power panel 16 to provide electrical service for operating the functional devices. The main line 14, 15 may provide a 220 VAC circuit which is split into three individual branch lines 10–12 at the power panel 16. The branch lines 10–12 each comprise a two conductor pair including a hot line and a ground line for conducting a voltage, such as 120 VAC for operating the functional devices, such as device D1.

The 90 functional devices, such as device D1, each receive operating power from one of the three branch lines 10–12 via an associated receiver, such as receiver R1 for device D1. Such receiver R1 is energized by signals from a corresponding transmitter T1.

90 activate switches, such as switch S1, permit an associated transmitter T1 to be selectively energized to generate the coded signals for enabling the corresponding receiver R1.

Each of the transmitters, such as transmitter T1, is operable to generate a unique coded signal detectable only by the corresponding receiver R1. Accordingly, the coded signals generated by any of the transmitters can be conducted over the power lines 10–12 simultaneously with only the designated receiver being enabled.

In the described embodiment, the enabling signals comprise frequency signals generated by the transmitters and superimposed on the AC power signals present on lines 10–12, and transmitted over the power lines 10–12 to each of the 90 receiver units connected thereto, with the power signals serving as the conducting medium. An RF trap or filter circuit 18 is connected between the power panel 16 and conductors 14, 15 which extend to the service entrance. The filter circuit 18 prevents frequency signals from being transmitted into or out of the system via conductors 14 and 15.

Different frequencies are assigned to different transmitter-receiver pairs to permit selective energization of a receiver in response to the enabling of the corresponding transmitter.

In the illustrated embodiment shown in FIG. 1, the ninety functional devices, such as devices D1, D31 and D61 connected to power lines 10–12 respectively, are controlled by only six frequencies, (i.e., 100 Khz, 130 Khz, 160 Khz, 190 Khz, 220 Khz and 250 Khz). Such operating mode is made possible by means of a time-division technique wherein each cycle of the 60 cycle AC power signal on lines 10–12 is divided into 15 time slots. The operation of each transmitter-receiver pair such as T1, R1, for example, is synchronized so that the generation of a frequency is limited to one of the 15 time slots for a given transmitter. Accordingly, each transmitter-receiver set such as T1, R1, associated with a functional device such as D1 can be tuned to generate one of the six tones during one of the 15 time slots, and as a result, 90 unique enabling signal combinations and 90 unique transmitter-receiver sets, such as T1, R1, can be realized. Each enabling signal will consist of a tone burst of a given frequency superimposed on the power signal during a certain time slot of the power signal.

Figures 2, 2A, 2B, 2C, 2D, 2E, 2F, 2G, 2H, 2I, 2J, 2K, 2L, 2M, 2N:
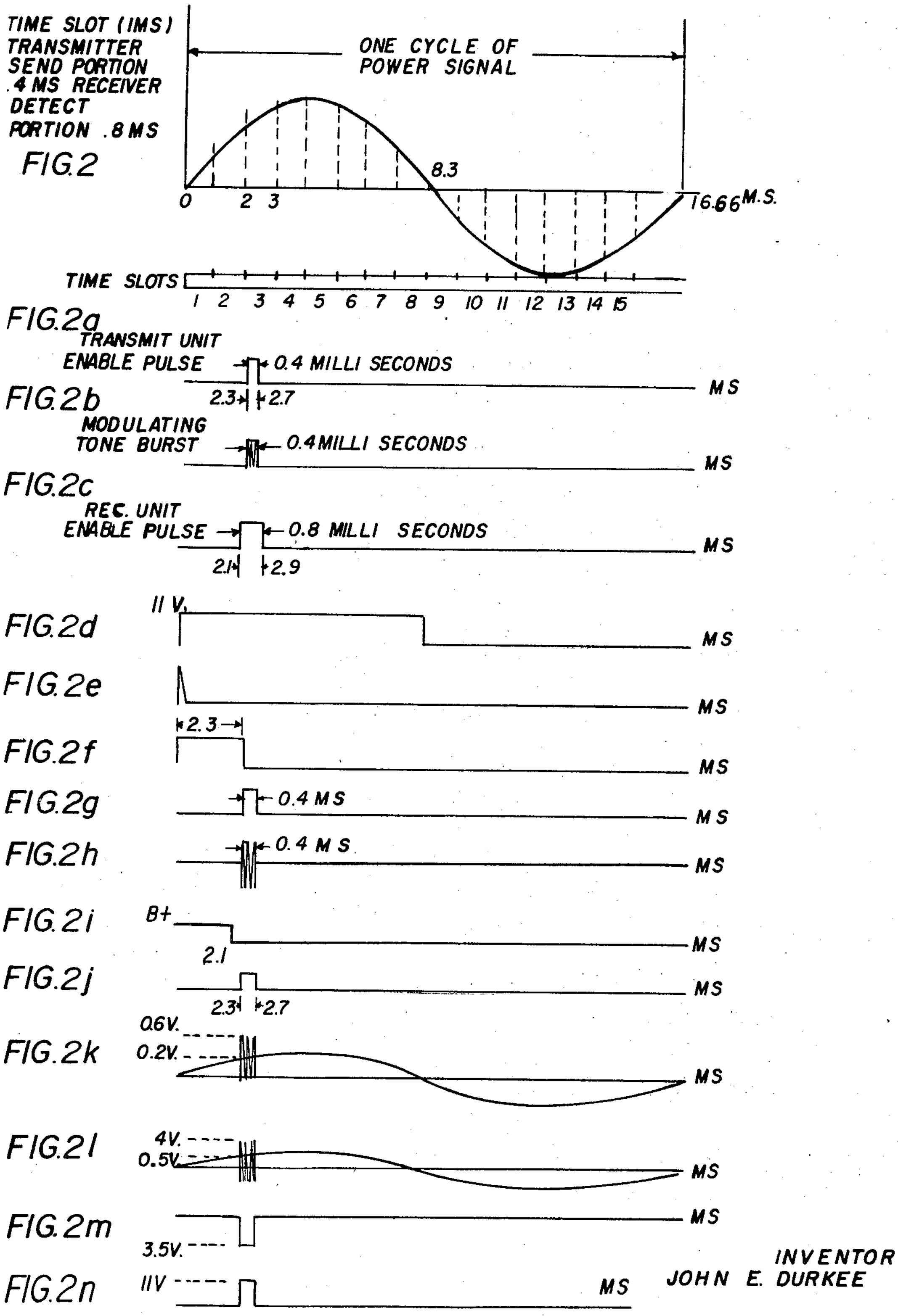
FIG. 2 shows the waveform of a cycle of an operating power signal subdivided into 15 time slots.
FIGS. 2*a*–2*c* show relationships between the time of occurrence of enable pulses provided by a transmitter and receiver units and the tone burst provided by the transmitter unit.
FIGS. 2*d*–2*n* show output wave forms of transmitter and receiver circuits.

This novel control arrangement, and particularly the relationship between the power signal and the 15 time slots is shown graphically in FIG. 2. As there shown, each cycle, 16.66 miliseconds, of the 60 Hertz power is divided into 15 time slots each time slot being approximately 1 millisecond in width.

Figure 3:
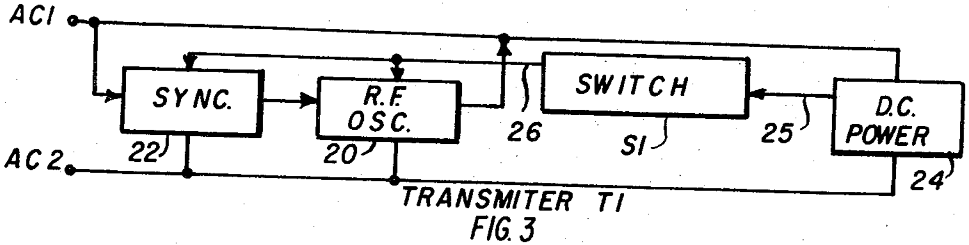
FIG. 3 is a block diagram of a transmitter for use in the system shown in FIG 1.

Referring to the transmitter block diagram of FIG. 3, each transmitter, such as transmitter T1, includes a synchronizing circuit 22 which is settable to enable an RF oscillator circuit 20 to generate one of the six tone bursts during a selected one of the 15 time slots.

For each of the 90 transmitters, such as T1, the oscillator circuit 20 is tuned to generate one of the six frequencies, such as 100 KHz for transmitter T1, and the synchronizing circuit 22 is set to provide an enabling signal for the oscillator circuit 20 during one of the 15 time slots, such as time slot three for transmitter T1. Each transmitter will thus have a unique signal transmission in the system defined by the time and frequency domains.

The transmitter T1 further includes a DC power circuit 24 connected between conductors AC1 and AC2 of the AC power source (i.e., line 10, for example) to supply DC bias to the sync circuit 22 and to the RF oscillator circuit 20. The output of the power circuit 24 is connected over conductor 25 and normally open activate switch S1 and conductor 26 to the sync circuit 22 and the oscillator circuit 20. The DC bias potential will be supplied to the circuits whenever the switch S1 is closed.

The sync circuit 22 has its input connected to conductors AC1 and AC2, which may be the hot line and ground, respectively, the conductors which comprise line 10, and its output connected to the input of the RF oscillator circuit 20. The sync circuit 22 is responsive to the power signal present on line 10 to provide the enable pulse at its output for enabling the RF oscillator 20 during a selected time slot (time slot three for transmitter T1) of the power signal.

Referring to FIG. 2*a*, there is shown a pulse which indicates the portion of the third time slot for which the transmitter oscillator 20 will be enabled to provide the tone burst as shown in FIG. 2*b*. In the exemplary illustration, the transmitter oscillator 20 is enabled for 0.4 milliseconds and accordingly the tone burst shown in FIG. 2*b* will last for about 0.4 milliseconds. Transmitter T1 is assumed to be tuned to provide a signal of 100 KHz during the third time slot.

Whenever the switch S1 (FIG. 3) for transmitter T1 is closed, synchronizing circuit 22 is enabled by the power signal on conductors AC1, AC2 of line 10, to generate an enable pulse (FIG. 2*g*) which enables the oscillator 20 a predetermined time after the start of the power signal cycle (zero crossover).

The output of the oscillator circuit 20 is connected to the conductor AC1 such that the 100 KHz signal generated during third time slot will be superimposed on the power signals present on the line AC1 during that portion of each cycle of the power signal as long as the switch S1 is operated. When the switch S1 is operated, the transmitter T1 may provide a tone burst for each cycle of the power signal, thus operating continuously. Alternately, the transmitter T1 may provide tone bursts for only a short duration, for example, the length of time a user depresses a button. In the latter case the receiver would include a bi-stable circuit which would alternately connect and disconnect the functional device each time the button is depressed.

Summarily, in response to the operation of activate switch S1, transmitter T1 is operative to generate a 100 KHz tone during third time slot of each cycle of the power signal, modifying that portion of the power signal and providing a wave form such as that shown in FIG. 2*k*.

The modified power signals provided by transmitter T1 are coupled to line 10 in the system of FIG. 1 and transmitted to all 90 receiver units connected to the power lines 10–12. The power signals on line 10 pass through the power panel 16 and are thus conducted to lines 11 and 12. Accordingly, the enabling signals generated by transmitter T1 are conducted to the inputs of each of the receivers, such as receivers R1, R31 and R61, for example.

Figure 4:
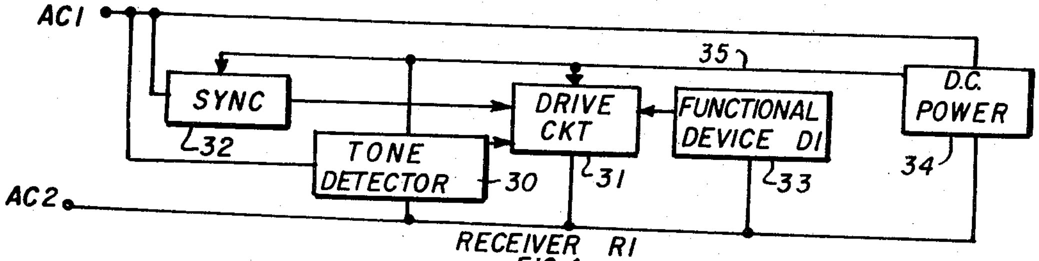
FIG. 4 is a block diagram of a receiver for use in the system shown in FIG. 1.

Each of the 90 receivers, such as receiver R1 shown in block form in FIG 4, includes a tone detector 30, a drive circuit 31 controlled by the tone detector 30 for connecting the functional device, such as device D1 associated with receiver R1, to the power line AC1, AC2, and a sync circuit 32 for enabling the drive circuit during the time slot for which the receiver is set, (i.e., the third time slot for receiver R1). A power circuit 34, connected from conductor AC1 to conductor AC2, derives a DC bias potential from the power signals on lines AC1, AC2, which is extended over conductor 35 to the sync circuit 32, the tone detector circuit 30 and the drive circuit 31.

Figure 5:
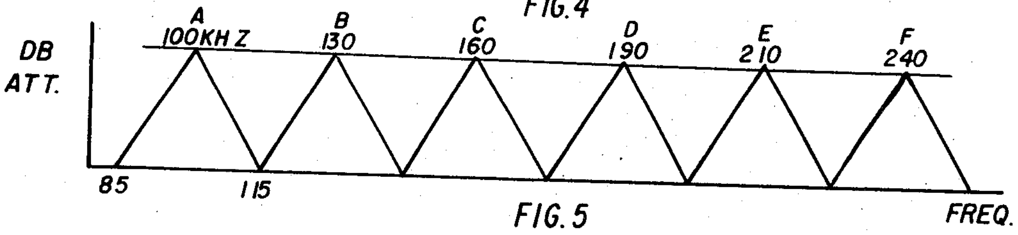
FIG. 5 shows the frequency band pass characteristics A–F for six different receiver units used in the system.

The tone detect circuit 30 of receiver R1 is tuned to detect the 100 KHz tone which modulates the power signals during the third time slot. The frequency band-pass characteristic of the tone detector 30 of receiver R1 is shown in FIG. 5 (characteristic A). As will be described, the tone detector circuit includes a frequency selective amplifier employing a twin-T frequency selective circuit, and thus, the characteristic shown in FIG. 5 is the inversion of that of a twin-T notch filter circuit. The filter characteristic provides an attenuation of approximately 30 DB at frequencies plus or minus 15 KHz from the center or tuned frequency. FIG. 5 also shows bandpass characteristics B–F for receivers for five other frequencies to which the transmitters are tuned in the disclosed embodiment.

The tone detector circuit 30 has its input connected to conductor AC1, and its output connected to the input of a load drive circuit 31 for controlling the drive circuit. The tone detect circuit is responsive to 100 KHz signals to provide a control signal at the input of drive circuit 31. However, the drive circuit will not be enabled until an enable pulse is provided by the sync circuit 32 during the third time slot.

The sync circuit 32 of receiver R1 has its input connected to the conductor AC1 and its output connected to drive circuit 31 and is responsive to power signals to provide an enabling pulse for the drive circuit during the third time slot of each cycle of the power signal on line 10. Receiver sync circuit 32 is set to enable the drive circuit 31 of receiver R1 to be responsive to the tone bursts transmitted by transmitter T1 for a period that is approximately double the period for which the tone bursts are provided to insure that ample time is provided for the detection by the receiver R1 of the signals transmitted by the corresponding transmitter T1. Thus, referring to FIG. 2C, there is shown a pulse approximately 0.8 milliseconds in duration which represents the time during which the receiver sync circuit 32 is operative to enable the receiver (FIG. 4C) drive circuit 31.

The functional device D1 (FIG. 4) associated with receiver R1 is connected to the power line AC1 whenever the drive circuit 31 is enabled responsive to the detection by the tone detector circuit 30 of a 100 kHz tone during the third time slot of the power signal.

TRANSMITTER MODULE

To simplify the understanding of the function and operation of the circuits which comprise the transmitter module, the waveforms at various points of the circuits are illustrated in FIGS. 2*d* through 2*h*, and will be referred to in the description of the circuits and of the operation of the circuits. The points in the transmitter circuit, shown in FIG 6, at which the waveforms of FIGS. 2*d*–2*h* occur are labelled points D–H, respectively, in FIG. 6.

Figure 6:
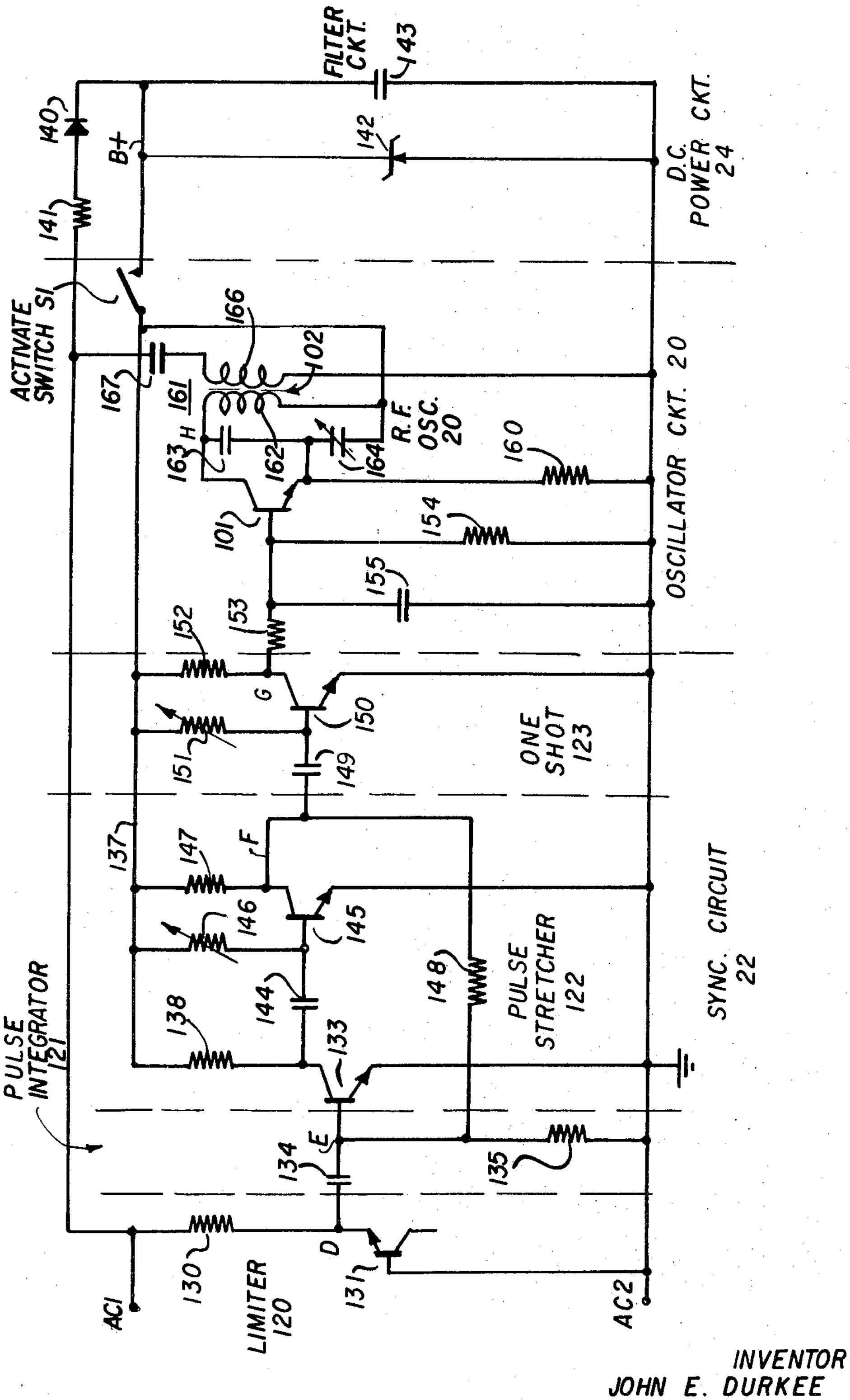
FIG. 6 is a schematic circuit diagram of a transmitter unit.

Referring then to FIG 6, there is shown a schematic circuit diagram for the transmitter T1. The transmitter includes an RF oscillator circuit 20 for generating the tones. The oscillator is a Class-C oscillator and includes a transistor 101 and a tuned circuit 102 including a transformer 161 and capacitors 163 and 164 connected effectively as a parallel tuned circuit between the collector and emitter of transistor 101.

The RF circuit 102 is tunable through adjustment of variable capacitor 164 or an adjustable core (not shown) in transformer 161, to generate tones of a frequency from the group consisting of six frequencies 100 KHz, 130 KHz, 160 KHz, 190 KHz, 220 KHz and 250 KHz, and in the present example is tuned to 100 KHz.

The transmitter oscillator 20 is energized when the activate switch S1 is closed. The closing of the switch S1 connects the oscillator and sync circuits to the B+ supply. The oscillator is enabled, that is an operate bias level is obtained, when an enable pulse is provided by the synchronizing circuit 22 at a selected time (time slot 3 for transmitter T1) of the power signal. Switch S1 may be a slide switch operated to provide continuous energization of the transmitter circuits for as long as the associated device is to remain operated, or the switch may be of the push button variety, momentarily operated by the user. In the present example, it is assumed the switch S1 provides continuous energization of the transmitter circuit.

The input stage of the synchronizing circuit 22 comprises a limiter stage 120 connected between conductor AC1 and conductor AC2 for deriving an enabling pulse (FIG. 2*e*) for the sync circuit from the power signals. The pulse provided by the limiting stage 120 effects control of a one-shot 123 in the output stage of the sync circuit 22 to provide the enable pulse (FIG. 2*g*) for enabling the RF oscillator circuit 20 during the third time slot.

The limiter circuit 120 includes a resistor 130 and a reverse connected unidirectional device 131 serially connected between conductors AC1 and AC2. The unidirectional device 131 may be a diode or a transistor having connections to its emitter base junction connected in series with resistor 130 and having its collector lead unconnected. The junction of the resistor 130 and the unidirectional device 131 is coupled through a capacitor 134 of an integrating network 121 to the base of a transistor 133 of the pulse stretching circuit 122. A resistor 135 is connected from the base of transistor 133 to conductor AC2 which serves as a ground or reference. The integrating network 121 formed by capacitor 134 and resistor 135 is responsive to positive half cycles of the limited signal provided by limiter circuit 120 as will be shown to generate a positive going pulse (FIG. 2*e*) at the leading edge of the limited power signal (FIG. 2*d*).

The pulse generated by the integrating network 121 enables the pulse stretching circuit 122 comprised of transistors 133 and 145 connected as astable multivibrator.

The emitter of transistor 133 is connected to conductor AC2 and the collector transistor 133 connected through a resistor 138, conductor 137 and normally open activate switch S1 to a source of DC bias B+.

The biasing voltage B+ is derived from the power line AC1 through the use of DC power circuit 24. The power signals are halfwave rectified and limited in amplitude through the use of resistor 141 connected in series with the diode 140 between conductor AC1 and the bias source point B+.

A Zener diode 142 and a capacitor 143 are each connected in shunt between the bias point B+ and conductor AC2 and act as a filtering circuit and voltage regulator for the halfwave rectified voltage provided by the power circuit 24.

Referring again to the pulse stretching circuit 122, the collector of transistor 133 is also coupled through capacitor 144 to the base of the second transistor 145 of the pulse stretching circuit 122. The emitter of transistor 145 is connected to conductor AC2 and the base of transistor 145 is further connected to the bias voltage B+ over a variable resistor 146, conductor 137 and switch S1.

The collector of transistor 145 is connected to the bias voltage B+ through a resistor 147, conductor 137, and switch S1. A feedback resistor 148 connects the collector of transistor 145 back to the base of transistor 133. The collector of transistor 145 is also coupled through a capacitor 149 to the base of transistor 150 of a one-shot circuit 123. The base of transistor 150 is connected over variable resistor 151, conductor 137 and switch S1 to the voltage B+. The collector of transistor 150 is connected to B+ through a resistor 152, and the emitter of transistor 150 is connected to conductor AC2. Transistor 150 is normally biased into saturation and a ground is present at the collector of transistor 150.

Resistor 146 is adjustable to determine the length of a pulse provided at the output of the pulse stretching circuit 122. The length of the pulse determines the time at which the one-shot 123 will be enabled. Accordingly, the one-shot enabling pulse may terminate in any one of the 15 time slots to enable the one-shot during that time slot. For transmitter T1, the pulse, FIG 2*f*, terminates in time slot three to enable the one-shot 123 by the trailing edge of the pulse (FIG. 2*f*) at the output of the pulse stretching circuit 122.

Resistor 151 of the one-shot circuit 123 which supplies the base bias for biasing the transistor into saturation also determines the duration for which the one-shot 123 will turn off. Resistor 151 is adjustable to provide an output pulse (FIG. 2*g*) of a predetermined width ranging, for example, from 0.2 to 0.6 millisecond in duration. For transmitter T1, the pulse width is assumed to be 0.4 milliseconds. This range is chosen to permit the receiver enable pulse width assumed to be 0.8 milliseconds to be approximately twice the width of the transmitter enable pulse and still fall within the 1 millisecond width alloted to each time slot (see FIG 2).

The normally grounded output of the one-shot circuit 123 at the collector of transistor 150 is extended through a resistor 153 to the base of transistor 101 of the RF oscillator circuit 20 to normally disable the oscillator. A resistor 154 and a capacitor 155 are connected from the base of transistor 101 to the conductor AC2.

The emitter of transistor 101 of the oscillator circuit is connected to conductor AC2 through a resistor 160 and the collector of transistor 101 is connected to the tuned circuit 102 having a first winding 162 of transformer 161 connected between the collector of transistor 101 and conductor 137 which is extended through switch S1 to the voltage B+, whenever the switch S1 is closed. A pair of serially connected capacitors 163 and 164 are connected in parallel with winding 162. Winding 162 and capacitors 163 and 164 form the tuning portion of the RF oscillator. The junction of capacitors 163 and 164 is connected to the emitter of transistor 101.

Transformer 161 includes a secondary winding 166 which is connected to conductor AC2 and through capacitor 167 to the hot line AC1. Accordingly, modulating signals (FIG. 2*h*) generated by the RF oscillator 20 are coupled via transformer 161 to the hot line AC1 to modulate power signals appearing thereon.

TRANSMITTER PACKAGE

Figure 8:
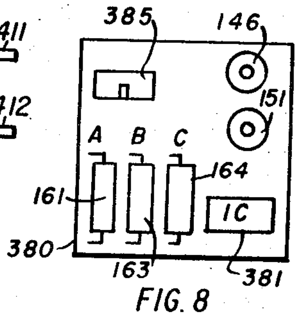
FIGS. 8 and 8*a* are plan views of printed circuit boards for mounting the circuits for a transmitter and a receiver, respectively.

The components of the transmitter circuits in one embodiment may be mounted on a printed circuit board 380, shown in FIG. 8. The active circuit elements, such as the semiconductors of the sync circuit 22 and associated bias elements, elements of the RF tone generating signal 20, and some elements of the power circuit 24 comprise an integrated circuit 381 used to minimize cost of the circuit and the size of the unit. Components such as inductor 161 and capacitors 163, 164 of the tuned circuit 102 of the tone generating circuit 20 are mounted separately on the printed circuit board to permit tuning of the transmitter to one of the six frequencies. Also, adjustable resistor 146 and 151 which provide slot selection and slot width adjustments, respectively, are located on the circuit board 380 to permit the transmitter to be adjusted. The adjustable elements are preferably factory set and the circuit sealed in a casing ( not shown); however, provision may be made to permit retuning of the transmitter to enhance the flexibility of the system. The activate switch 385 is mounted on the circuit board 380 and extends through the casing (not shown) for the transmit unit.

OPERATION OF TRANSMITTER CIRCUIT ENABLE PULSE GENERATION

When switch S1 is closed for the transmitting circuit such as T1, the transmitter circuit is operable to provide tone bursts during a selected time slot (time slot three for T1) of each cycle of the power signal which tone bursts are superimposed on the power signals present on line 10 to provide coded enable signals for the associated receiver circuit R1 to be described.

Referring to FIG. 6 in conjunction with FIGS. 2*d*–2*h*, power signals present on conductor AC1 of line 10 pass through the limiter stage 101 to point D and, as shown in FIG. 2*d*, the amplitude of the power signals is limited to approximately 11 volts for each positive half cycle. THe negative half cycles of the power signals are conducted to ground when rectifying device 131 becomes forward-biased.

This limited signal is coupled to the integrating network 110 and is integrated to provide a positive going sync pulse at the leading edge of the limited signal (FIG. 2*e*).

The sync pulse output at E (FIG. 6) turns on transistor 133 of the pulse stretching circuit, extending ground to the collector of transistor 133. The negative going pulse, thus generated at the collector of transistor 133 is coupled through capacitor 144 to the base of transistor 145, turning off transistor 145 such that the potential at the collector of transistor 145 (point F) rises toward a potential B+.

The pulse shown in FIG. 2*f* provided at the output (point F) of the pulse stretching circuit 122, may range in duration from 1 to 15 milliseconds in width and determines the time after the beginning of the cycle of the power signal at which the one-shot 123 will be enabled to provide the oscillator enable pulse. The pulse stretching circuit 122 includes a time slot width adjustment resistor 146 for setting the width of the one-shot enabling pulse, to determine the time at which the pulse for enabling the one-shot is generated. In the example shown (i.e., transmitter T1), the tone signals are generated during the third time slot, which begins 2 milliseconds after the zero crossing of the power signal (FIG. 2). The transmitter enable pulse width is set at 0.4 milliseconds. Accordingly, the one-shot enabling pulse shown in FIG. 2*f* will terminate approximately 2.3 milliseconds after the zero crossing of the power signal. At such time, the trailing edge of the pulse (FIG. 2*f*) will trigger the one-shot circuit 123 by the negative going pulse which is coupled through capacitor 149 to the base of transistor 150 as the pulse stretching circuit turns off.

It is pointed out that the length of the pulse provided by the pulse stretching circuit provides slot selection for the transmitter and were transmitter T1 for example to be set to operate in a different time slot than time slot 3, such as time slot 15, the one-shot enabling pulse would be approximately 14 milliseconds in duration.

When the one-shot 123 is triggered by the trailing edge of the pulse shown in FIG 2*f*, transistor 150 is turned off, momentarily, and an enabling pulse (0.4 milliseconds in duration in the present example) is provided at the output point G (FIG. 2*g*) of the one-shot 123. The width of this pulse is adjustable over a range such as 0.2 to 0.6 milliseconds, by adjustment of variable resistor 151. As can be seen in FIG. 2*g*, the enable pulse (for transmitter T1) begins 2.3 milliseconds after zero crossing of the power signal and ends 2.7 milliseconds after the zero crossing.

FREQUENCY TONE GENERATION

The RF oscillator 20 is energized at approximately 2.3 milliseconds after the zero crossover by the enable pulse for 0.4 milliseconds, providing a 0.4 millisecond tone burst of a frequency of 100 KHz ( FIG. 2*h*). The tone bursts thus provided at the output of the RF oscillator 20, point H, FIG. 2H, are coupled to the power line AC2 via transformer 161 and capacitor 167. These tone bursts are superimposed on the power signals present on line AC1 and are thus carried throughout the system over lines 10–12, FIG. 1, to the inputs of all the 90 receivers, including receiver R1, connected to lines 10–12.

RECEIVING UNIT

The power signals modified by tone bursts provided in response to the operation of one of the transmitters, such as transmitter T1, are effective to enable a corresponding receiver R1 for transmitter T1, to cause energization of an associated functional device, such as device D1, associated with the transmitter-receiver pair T1, R1.

Figures 7, 7A:
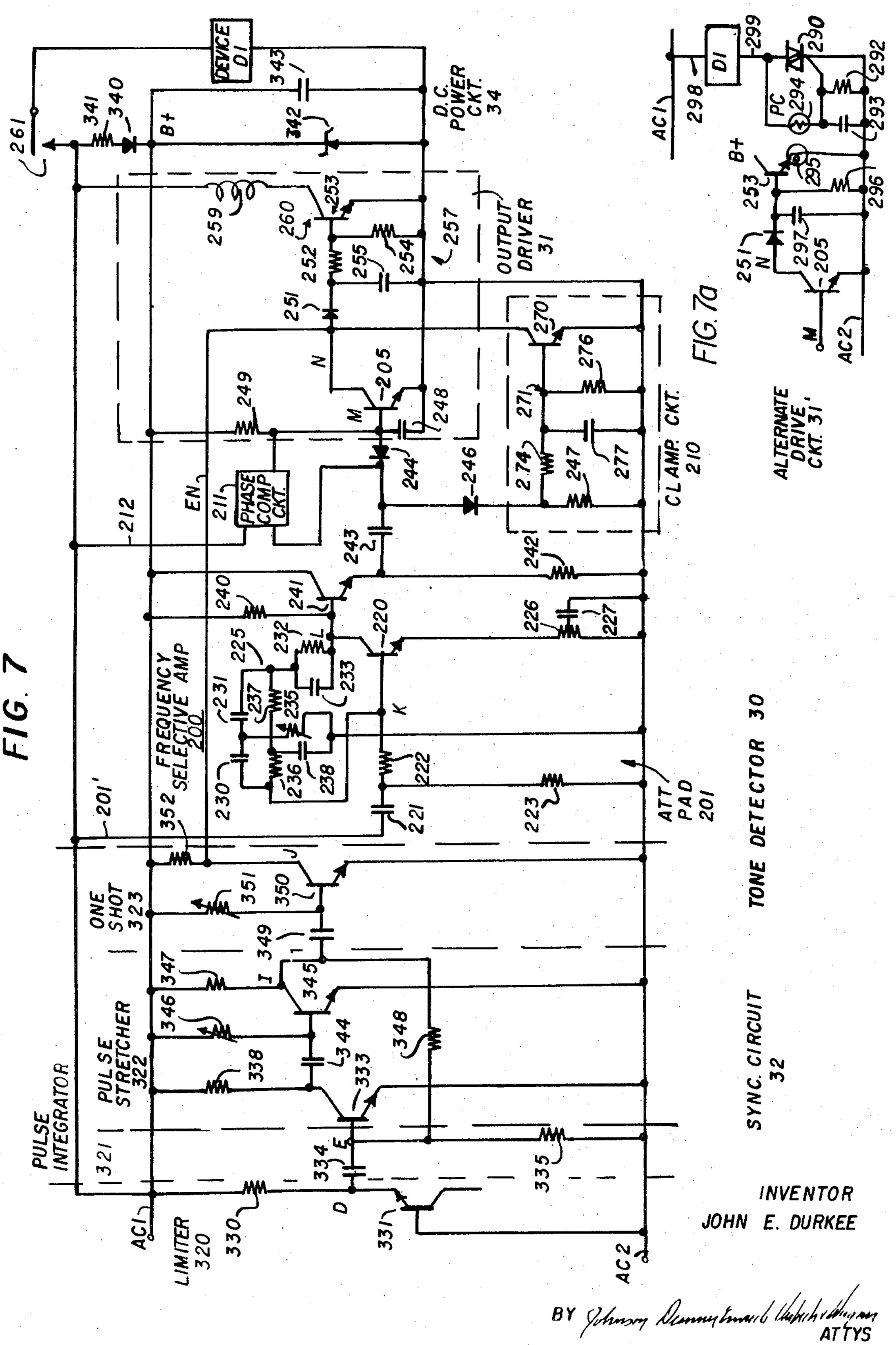
FIG. 7 is a schematic circuit diagram of a receiver unit.
FIG. 7*a* shows a schematic circuit diagram of an alternate output drive circuit for the receiver.

Referring to the schematic circuit diagram of the receiver R1 given in FIG. 7, the receiver R1 is responsive only to power signals having a 100 Khz tone superimposed on the power signal during the portion of the power signal which comprises the third time slot. The frequency selectivity is provided through the use of a tone detecting circuit 30. A sync circuit 32, which is similar to the sync circuit 22 of the transmitter T1, is provided to enable the receiver to be responsive to tone bursts of a 100 Khz frequency (for receiver R1) only during the third time slot. The output of the tone detecting circuit 30 provides an enabling signal for a drive circuit 31 which effects the connection of the functional device D1 associated with receiver R1 to the power line AC1 for receiving operating current thereover.

The tone detecting circuit 30 includes a frequency selective amplifier 200 coupled to conductor AC1 through an attenuation pad 201 which includes a capacitor 221 and a pair of resistors 222,223. The pad provides approximately 80 db of attenuation to the 60 hz power signal frequency. The frequency selective amplifier 200 includes a transistor 220 having its base coupled to conductor AC1 through the series connection of a capacitor 221 and a resistor 222 of the attenuation pad 201. A resistor 223 is connected from the junction of capacitor 221 and resistor 222 to conductor AC2.

The frequency selective amplifier 200 further includes a twin-T, frequency responsive network 225 connected between the base and the collector of transistor 220. The twin-T network 225 includes a pair of series capacitors 230 and 231 connected from the base of transistor 220 to the collector of transistor 220 through a filter network including a resistor 232 and a capacitor 233 connected in parallel with resistor 232. The junction of capacitors 230 and 231 is connected to conductor AC2 through a resistor 235 which is used for tuning the frequency selective network 225 to the desired pass frequency which is 100 Khz for the receiver R1.

A second branch of the twin-T network 225 includes series connected resistors 236 and 237 which are, in turn, connected in parallel with capacitors 230 and 231. The junction of resistors 236 and 237 is connected to the conductor AC2 through a capacitor 238.

The emitter of transistor 220 is connected to conductor AC2 through a potentiometer 226. A capacitor 227 is connected between a variable resistance tap of the potentiometer 226 and conductor AC2. The circuit formed by the potentiometer 226 and the capacitor 227 permits adjustment of the Q of the twin-T network 225.

The collector of transistor 220 is connected to B+ through a resistor 240.

The biasing voltage B+ is derived from the power line AC1 through the use of DC power circuit 34. The power signals are half-wave rectified through the use of diode 340 which together with a resistor 341 connected in series with the diode 340 connect conductor AC1 to the bias point B+.

A zener diode 342 and a capacitor 343 are separately connected in shunt between conductor B+ and conductor AC2, and act as a filtering circuit and voltage regulator for the half-wave rectified voltage provided by the DC power circuit 34.

The output of the frequency selective amplifier 200, at the collector of transistor 220, is also connected to the base of a transistor 241 which acts as a signal amplifier. The collector of transistor 241 is connected directly to B+ bias potential, and the emitter of transistor 241 is connected to conductor AC2 through a resistor 242. Transistor 241 is connected in emitter-follower configuration to act as a buffer between the frequency selective amplifier 200 and the output drive circuit 31.

The output of transistor 241 is coupled to the base of transistor 205 through capacitor 243 and a reverse connected diode 244. A second diode 246 is connected in the forward direction from the junction of capacitor 243 and diode 244 through a resistor 247 of a clamping circuit 210 to conductor AC2. Thus, the negative half cycles of the signals passed by the frequency selective amplifier 200 will be passed to the input of the output driver circuit 31 and the positive half cycles of the signal will be passed through diode 246 to the clamping circuit 210.

The base of transistor 205 is connected through a resistor 249 to the bias potential +B and through capacitor 248 to conductor AC2. The emitter of transistor 245 is connected to conductor AC2.

The collector of transistor 205 is connected through a forward connected diode 251 and a resistor 252 to the base of transistor 253. The emitter of transistor 253 is connected directly to conductor AC2 and the base of transistor 253 is connected through a resistor 254 to conductor AC2. A capacitor 255 is connected between the junction of diode 251 and resistor 252 and conductor AC2 providing a time delay which requires a predetermined number of repetitive tone bursts before transistor 253 will conduct.

The collector of transistor 253 is connected to the conductor AC1 through the relay winding 259 which, when energized, closes contacts 261 and completes a circuit for the functional device D1 between conductor AC1 and conductor AC2 for energization of the device D1. The drive circuit 31 of the receiver R1 is enabled by the receiver synchronizing circuit 32 during the third time slot of the power signal by an enabling pulse ( FIG. 2*j*) on conductor EN.

The sync circuit 32 of receiver R1 includes a one-shot circuit stage 323 which provides the enabling pulse for the drive circuit. The one-shot 323 is in turn enabled by a pulse ( FIG. 2*i*) derived from the power signals on conductors AC1, AC2 by a limiter stage 320, an integrating network 321, a pulse stretching circuit 322 tandemly connected between the conductors AC1, AC2 and the one-shot circuit 323.

The limiter stage 320 includes a resistor 330 and a reverse-connected unidirectional devices 331 serially connected between conductors AC1 and AC2. The unidirectional device may be a diode or a transistor having its emitter-base junction connected in series with resistor 330, and having its collector lead unconnected.

The junction of the resistor 330 and the unidirectional device 331 which form the limiter stage 320 is coupled through a capacitor 334 of the integrating network 321 to the base of a transistor 333 of the pulse stretching circuit 322. Capacitor 334 and a resistor 335 connected from the base of transistor 333 to conductor AC2 from the integrating network 321.

The emitter of transistor 333 of the pulse stretching circuit 322 is connected to conductor AC2, and the collector of transistor 333 is connected to DC bias B+ through a resistor 338.

The collector of transistor 333 of the pulse stretching circuit 322 is also coupled through a capacitor 344 to a second transistor 345 of the pulse stretching circuit 322. The emitter of transistor 345 is connected to conductor AC2, and the base of transistor 345 is connected to +B through a variable resistor 346.

Resistor 346 provides the adjustment which permits selection of the one of the 15 time slots of the power signal during which the synchronizing circuit 32 is operative to enable the output driver circuit 31.

The collector of transistor 345 is connected to the bias voltage +B through a resistor 347. A feedback resistor 348 connects the collector of transistor 345 back to the base of transistor 333. The collector of transistor 345 is also coupled to the base of transistor 350 of the one-shot circuit 323 through a capacitor 349. The base of transistor 350 is connected to the voltage B+ through a variable resistor 351. The collector of transistor 350 is connected to bias through a resistor 352, and the emitter of transistor 350 is connected to conductor AC2.

Variable resistor 351 of the one-shot circuit 323 permits adjustment of the width of the output pulse which determines the length of time for which the receiver ( i.e., R1) will be enabled. The pulse width may range, for example, from 0.6 to 1.2 milliseconds in duration. This range is chosen to permit the receiver sync pulse width to be approximately twice the width of the oscillator enable pulse provided by transistor sync circuit 220. In the described example, the width of the receiver enable pulse is assumed to be 0.8 milliseconds to be approximately twice the setting of the enable pulse width (0.4 milliseconds) for the sync circuit 22 of the corresponding transmitter T1.

The output of the one-shot circuit 323 at the collector of transistor 350 is connected over conductor EN to the collector of transistor 205.

CONTINUOUS CLAMP CIRCUIT

A continuous signal clamp circuit 210 provides protection against extraneous noises in the form of steady signals of a frequency close to one of the six frequencies to which the receiver may be tuned and which may be introduced into the system over the power lines. The clamp circuit 210 is connected from the output stage (transistor 241) of the tone detect circuit 30 to the output stage (transistor 253) of the drive circuit 31 to disable transistor 253 whenever the duration of the detected tone is longer than a selected duration.

The positive half cycles of the tone bursts at the emitter of transistor 241 are coupled through capacitor 243, a forward connected diode 246 and a resistor 274 of the clamp circuit 210 to the base of a transistor 270 of the clamp circuit 210. A resistor 247 is connected from the junction of the diode 246 and resistor 274 to conductor AC2. A resistor 276 and a capacitor 277 are separately connected between the base of transistor 270 and conductor AC2. The emitter of transistor 270 is connected to conductor AC2 and the collector of transistor 270 is connected to point N.

The potential at point N controls the operation of transistor 253, the output stage of the drive circuit 31. Transistor 270 is normally turned off; however, whenever the tone bursts detected by tone detect circuit 30 exceed a preselected duration, transistor 270 is turned on, extending a ground to point N, thereby inhibiting operation of transistor 253.

RECEIVER PACKAGE

Figure 8A:
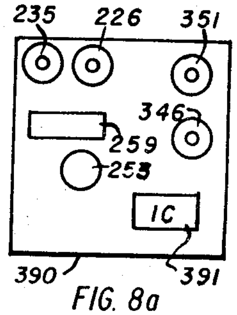

The components of the receiver circuits may be mounted on a printed circuit board 390 shown in FIG. 8*a*. The active circuit elements, such as the semiconductors of the sync circuit 32, the tone detect circuit 30, and associated bias elements comprise an integrated circuit 391 used to minimize the cost of the circuit and the size of the unit. Other components, such as the transistor 253 and the relay 259 of the drive circuit 31 are discrete components mounted on the circuit board.

Adjustable resistors 346 and 351 which provide slot selection and slot width adjustments, respectively, are located on the circuit board to permit adjustment of the receiver sync circuit. These resistors are preferably factory-set and the circuit board sealed in a casing (not shown).

In addition, the frequency and Q-adjust elements of the frequency selective amplifier namely, resistors 235 and 226 are also mounted on the circuit board to permit tuning of the tone detecting circuit.

ENABLE PULSE GENERATION

Operation of Receiver Circuits

Whenever the transmitter T1 is energized, the coded signals, tone bursts of 100 Khz which are superimposed on the power signals are conducted from transmitter T1 over the power line 10, FIG 1, which comprises conductors AC1 and AC2, shown in FIG. 7.

The coded power signals enable the sync circuit 32 and the tone detect circuit 30 of the receiver R1 which, in turn enable the output drive circuit 31 to connect the functional device D1 across the power line AC1, AC2.

The sync circuit 32 of the receiver R1 is responsive to the power signals to provide a sync pulse for enabling the output drive circuit during the third time slot. The sync circuit 32 operates similarly to the sync circuit 22 of the transmitter T1 except that the width of the sync pulse provided by the receiver sync circuit 32 is greater than the width of the sync pulse provided by the transmitter sync circuit 22 to insure that the receiver will be enabled to be responsive to tone signals when the signals are transmitted.

Referring to FIG. 7, the coded signals on conductor AC1 are limited in amplitude by the limiter stage of the sync circuit providing at point D in FIG. 7 the waveform shown in FIG. 2*d*. The 120 VAC power signal is clipped at a level of approximately 11 volts, for each positive half cycle of the power signals. The negative half cycles of the power signals are conducted to ground when rectifying device 331 becomes forward biased.

The leading edge of the limited power signal is integrated by the integrating network 321 to provide a sync pulse ( FIG. 2*e*) for operating the pulse stretching circuit 322. The pulse stretching circuit 322, when operated, enables the one-shot 323 at the proper time to provide the enable pulse for enabling the drive circuit 31 during the third time slot.

The sync pulse ( FIG. 2*e*) provided by integrating the limited power signal, turns on transistor 333 of the pulse stretching circuit, and the ground potential at its emitter is extended to its collector causing a negative going pulse to be coupled through capacitor 344 to the base of transistor 345 of the pulse stretching circuit 322, turning transistor 345 off. When transistor 345 turns off, the potential at the collector of transistor 345 rises toward B+.

Transistor 345 will remain turned off for a length of time determined by the values of resistor 346 and capacitor 344. Referring to FIG. 2*i*, the capacitor 344 has been selected and variable resistor 346 has been adjusted so that the B+ output provided at the output point I of the pulse stretching circuit 322 starts at the zero crossing of the power signal and lasts for 2.1 milliseconds at which time the output goes to ground to trigger the one shot 323.

The one-shot 323 is set to provide a pulse 0.8 milliseconds (see FIG. 2*c*) in duration. Since the one-shot is enabled by the pulse stretching circuit 322 and will remain enabled at 2.1 milliseconds which time slot is designated as time slot three (FIG. 2) in the system. As will be shown, although the one shot is enabled from 2.1 milliseconds until 2.9 milliseconds, the output will be clamped at ground potential by the tone detect circuit 31 unless a tone is being detected. Thus, the enable pulse shown in FIG. 2j at the output (point J) of the receiver one-shot 323 is the same width (0.4 milliseconds) as the transmit enable pulse shown in FIG. 2*g*. There are in the exemplary system 14 other groups of receivers, each group having its pulse stretching circuit set to provide an enabling pulse at a correspondingly different one of the time slots. The receivers in each are in turn distinguishable, one from the other by the frequency to which its tone detector is tuned as will be shown.

Transistor 350 of the one-shot is normally turned on providing a ground at its collector and on lead EN connected thereto. When the pulse stretching stage 322 of the sync circuit 32 restores to its idle state at 2.1 milliseconds, the negative going trailing edge of the output level of the pulse stretching circuit 322 is coupled through capacitor 349 to the base of transistor 350 of the one-shot turning the transistor 350 off, and the ground on the emitter of the transistor is no longer extended to the collector of the transistor. However, the potential of the collector of the transistor is inhibited from rising toward B+ potential supplied through resistor 352 because of the ground supplied over lead EN by the detect circuit 30. Transistor 350 of the one-shot will be turned on at 2.1 milliseconds after the zero crossing (See FIG 2*c*). However, the enable pulse (FIG. 2*j*) will not be provided until 2.3 milliseconds (FIG. 2*j*) and then only if a 100 Khz tone burst is detected by the tone detect circuit 30. The enable pulse for the drive circuit 31 will last until 2.7 milliseconds as shown in FIG. 2*j* because of the ground provided at point N by the tone detect circuit.

The width of the enable pulse is determined by the adjustment of the variable resistor 351 and the value selected for capacitor 349. The value of the resistor in the present example is selected such that the transistor is turned on at 2.1 milliseconds and turned off at 2.9 milliseconds (FIG. 2*c*). However, as pointed out, due to the ground from the output of the tone detect circuit, the enable pulse (FIG. 2*j*) will last from 2.3 to 2.7 milliseconds. The enable pulse is conducted over lead EN to the drive circuit 31 and coupled through diode 251 and resistor 252 to the base of transistor 253.

TONE DETECTION

As noted above, each of the six receivers of the group including receiver R1 (all of which are synchronized to operate in the third time slot of each cycle of the power signal) have a tone detecting circuit tuned to a different frequency. Thus, the tone detecting circuit 30 for receiver R1 is assumed to be tuned to 100 Khz, and as will be shown, only receiver R1 of the six receivers synchronized to operate at the third time slot, will be enabled.

More specifically, the power signals on conductors AC1, AC2 are also coupled via conductor 201' and the attenuation pad 201 to the input of the frequency selective amplifier 200. The pad 201 attenuates the 60 Hz power signal approximately 80 db, however, the 100 KHz signal is attenuated only about 3 db by the pad 201. The resulting signal at the point labeled K in FIG. 7, shown in FIG. 2*k*, consists of a 60 Hz carrier approximately 0.2 volts peak with a 100 KHz tone burst 0.6 volts peak superimposed on the carrier. All signals of frequencies passed by the network (except 100 Khz signals) are fed back to the input to the network in phase opposition with the signals appearing thereat, such that the signals of like frequencies but different phases cancel one another and only the 100 Khz signals are passed to the output point L of the frequency selective amplifier providing the wave form shown in FIG. 21. The amplifier 200 also provides an approximate gain of 15 db for the 100 Khz signal. The amplifier output shown in FIG 21 comprises a tone burst approximately 4 volts peak superimposed on a 60 Hz ripple voltage approximately 0.5 volts.

The signal output of frequency selective amplifier 200 is passed through transistor 241, connected in an emitter-follower configuration, which acts as a buffer stage between the frequency selective amplifier 200 and the output drive circuit 31.

The negative half cycles of the 100 Khz signals at the emitter of transistor 241 are coupled through capacitor 243 and reverse-connected diode 244 to the base of transistor 205, turning transistor 205 off and removing ground from the collector (point N) of transistor 205, for the duration of the tone burst which is approximately 0.4 milliseconds. The capacitor 248 is charged by the negative half cycles of the tone burst signals and maintains transistor 205 turned on during the positive half cycles.

When the ground is removed from point N, the potential at point N will begin to rise toward B+ potential due to the potential at the collector (point J) of transistor 350 of the sync circuit 32, and this potential is coupled through the timing network 257 comprised of capacitor 255 and resistor 252 and 254 to the base of transistor 253 of the drive circuit 31.

The timing network is effective to delay the energization of the functional device D1, until a number of bursts operated by receiver R1 of the 100 KHz tone have been detected. Each time the activate switch S1 (FIG. 6) is operated to energize transmitter T1, a train of 100 KHz tone bursts will be generated at a repitition rate of 60 times/sec and will continue until the switch S1 is deactivated. The value of capacitor 255 determines the number of tone bursts required to effect the operation of the drive circuit 31.

When the number of tone bursts detected exceeds the selected number, capacitor 255 will have charged to a voltage sufficient to turn on transistor 253 thereby connecting ground to one end of the relay coil 259 closing contacts 261 to connect the functional device across conductors AC1, AC2. When the device D1 is connected to conductor AC1, the device is energized by the power signals, present on conductor AC1.

The coding technique by which a predetermined minimum number of tone bursts of a selected frequency must be detected at particular time slot in each cycle as indicated by the sync circuit provides further protection against signal transients which might be introduced into the system.

PROPORTIONAL CONTROL

Alternately, transistor 253 in the output stage 260 of the drive circuit 30 may be connected in emitter-follower configuration as shown in the drive circuit 31', FIG 7*a*, for controlling a quadrac switching device 290 to connect the functional device D1 to the power line conductors AC1, AC2. The collector of transistor 253 is connected to the bias voltage B+ and the emitter of transistor 253 is connected to conductor AC2 through a lamp 295.

The functional device D1 has one terminal 298 connected to conductor AC1, and another terminal 299 is connectable by the switching device 290 to conductor AC2. A branch circuit comprising the series connection of a photocell 294 and a resistor 292 is connected in parallel with the quadrac switching device 290 between terminal 299 of device D1 and conductor AC2. The gate of the quadrac switching device 290 is connected to the junction of the resistors 292 and the photocell 294. A capacitor 293 is connected in parallel with resistor 292.

The pulse at the collector of transistor 205 point (N) has an amplitude equal to B+ and a width equal to the width of the transmitter T1 enabling pulse. Its average D.C. level is a function of its amplitude, width and repetition rate.

Figure 9:
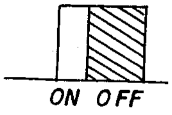
FIGS. 9 and 9*a* show wave forms of a transmitter or receiver sync pulses of different durations.
Figure 9A:
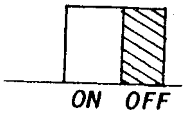

The enable pulse, shown in FIG. 9*a*, has a larger average DC value than the enable pulse shown in FIG. 9, and thus, transistor 253 will be driven harder by the wider pulse, providing a larger value of gate current for the quadrac 290.

If a manual control is provided at transmitter T1, to control its enabling pulse width, it will also control the average D.C. level at the base of transistor 253. This in turn will control the brilliance of lamp 295 in the emitter circuit of transistor 253. A varying light level from lamp 295 falling on photo cell 294 will cause ohmic resistance of the photocell to change and thus cause a shift in the triggering point of quadrac 290 varying the A.C. power delivered to device D 1. Thus the circuit shown in FIG. 7a will provide a proportional control usable as a light dimmer, motor speed control, temperature control, etc.

TIME DELAY-LOAD CIRCUIT

REferring to FIG. 7, the resistor 254 connected in the output driver timing circuit 257 permits the functional device D1 to remain operated for a selected time after the tone bursts transmitted by the corresponding transmitter T1 have stopped.

Assuming the transmitter unit when activated provides tone bursts continually until the transmitter is deactivated, the resistor 254 provides a discharge path for capacitor 255 which maintains the driving transistor 253 operated responsive to tone bursts provided by the transmitter. If the value of resistor 254 is small, the capacitor will discharge rapidly when the tone bursts cease causing transistor 253 to turn off soon after the transmitter is deactivated. On the other hand, if the value of the resistor 254 is large, capacitor 255 will discharge more slowly and the output transistor 253 will turn off a selected time after the transmitter has been deactivated.

Thus, for example, if the functional device D1 is a lamp, the turn off of the lamp can be controlled such that the lamp would remain on for a few seconds after the transmitter has been deactivated, allowing the user time to move out of the room before the light is turned off.

OPERATION OF CONTINUOUS SIGNAL CLAMP CIRCUIT

The output of transistor 241 is also coupled over capacitor 243 and forward connected diode 246 to a continuous signal clamp circuit 210 which includes a timing network 271 including resistors 274 and capacitor 277, responsive to positive half cycles of the tone bursts (100 kHz for receiver R1) detected by the detector circuit 30. The continuous signal clamp circuit is operable to measure the duration of a detected tone burst and if the tone burst is not interrupted periodically, the clamp circuit 210 provides an inhibit signal for the drive circuit 31.

Assuming that a 100 Khz continuous tone is being generated in the vicinity of receiver R1 and is coupled to lines AC1, AC2, the 100 Khz tones will be detected by the tone detect circuit 30, providing the necessary controlling signal at point N. Since the sync circuit 32 provides an enabling pulse during the third time slot of each cycle of the power signal, the receiver R1 would be enabled when the enable pulse is provided by the sync circuit even through none of the transmitters, particularly transmitter T1, has been activated.

During alternate half cycles of the power signals, the negative half cycles of the 100 Khz continuous tones are conducted through diode 244 to the base of transistor 205 and the positive half cycles of the continuous tone are conducted through diode 246 to the timing network 271. Since the 100 kHz tone is continuous, capacitor 277 will charge to a voltage sufficient to cause transistor 270 to turn on and extend ground or reference potential to point N, inhibiting operation of the drive circuit 31.

The clamp circuit 210 distinguishes between tone bursts generated by one of the 90 transmitters and a continuous tone coupled into the system over a power line through the use of the timing network 271 of the clamp circuit 210. In the worst case conditions, wherein 15 transmitters may each be tuned to generate 100 kHz tones in a different one of the 15 time slots, the sync circuits associated with these transmitters will cause a pause between tones in adjacent time slots and also at the end of cycle of the power signal, for example, a period of 1.66 milliseconds, during which time neither the transmitter or receiver sync circuits will provide enabling pulses.

Since a number of tone bursts and accordingly, a number of cycles of the power signal, are required to effect enabling of the drive circuit 31, the continuous clamp circuit 210 which is responsive to tone bursts which last for more than 15 milliseconds to inhibit the drive circuit 31, provides a way to distinguish between transmitted tone bursts, and extraneous tone signals.

The capacitor 277 may for example be chosen to have a discharge time of approximately 1.66 milliseconds. In such an arrangement, tone bursts generated by any of the 90 transmitters will not be effective to turn on transistor 270 to inhibit the drive circuit, while on the other hand, continuous tones, not generated by a transmitter, but coupled into the system, will enable transistor 270 to inhibit operation of the drive circuit 31.

SYSTEM OPERATION

The foregoing description has shown how a specific transmitter-receiver set (T1, R1) is used to control a functional device (D1) by generating tone bursts for modifying power signals and detecting the modified power signals to enable a drive circuit to connect the functional device to the power line which then receives energizing power from the power line.

Referring to FIG. 1, each of the 90 transmitter-receiver sets operate similarly to set T1, R1 described in the foregoing. Each of the 90 transmitters, such as transmitter T1 is turned to generate one of the six frequencies, i.e., 100 KHz, 130 KHz, 160 KHz, 190 KHz, 220 KHz or 250 KHz during one of the 15 time slots. Each transmitter is alloted a tone frequency and a time slot such that the 90 transmitters each have a unique coding. Thus, for example, transmitters T1 and T2 may be assigned different time slots and the same or different frequencies. Moreover, transmitters T1 and T60 may be assigned the same time slot but tuned to provide different frequencies.

Similarly, the 90 receivers are tuned to detect the frequency generated by the corresponding transmitters during the time slot alloted to the corresponding transmitter. Receivers R1 and R2 are assigned different time slots and the same or different frequencies (in correspondence with associated transmitters T1 and T2) and receivers R1 and R60 are assigned the same time slot but are tuned to different frequencies to correspond to associated transmitters T1 and T60. Thus the coded signals of each transmitter are capable of energizing only the corresponding one of the receivers.

Transmitter T1, connected to power line 10, is activated by the operation of switch S1 to generate coded signals for enabling receiver R1 also connected to power line 10, to effect the connection of device D1 associated with receiver R1 to power line 10 for operation by the power signals on the power line 10.

Similarly, transmitters T2 and T3 also connected to line 10 are operable when activated through the operation of switches S2 and S3, respectively, to enable corresponding receivers R2 and R3. Receiver R2 is connected to line 10 and, when enabled, connects device D2 to line 10 for operation.

Receiver R3 is connected to the line 10 over an electrical outlet or receptical G3 which is permanently connected to line 10. The receiver R3 includes an electrical plug P3 allowing the receiver R3 to be plugged into the outlet G3, to receive the coded signals generated when transmitter T3 is operated and be enabled to connect power to the associated device D3 through the receiver over the electrical outlet G3.

An electrical outlet G1 may be controlled as a functional device D31, and connected to a power line such as line 11, by a receiver, such as receiver R31, thereby permitting control of any device such as an electrical appliance plugged into the outlet. Outlet G1 is normally disconnected from the power line 11 (or deenergized) and any device plugged into the outlet G1 will be normally unoperated. When transmitter T31 is activated through the operation of switch S31, coded signals will be generated and transmitted over line 11 to receiver R31 which will be enabled and will effect the connection of outlet G1 to line 11.

The coded signals generated by the operation of any of the transmitters, such as T1, T3, T29 shown connected to line 10 will be conducted over line 10 and also, via the power panel 16, over power lines 11 and 12 to receivers R1, R3, R29, respectively. Thus, it is not necessary that the transmitter and the receiver of a set be connected to the same power line. For example, transmitter T29 connected to line 10 when activated by switch S29 is operative to generate coded signals for enabling receiver R29 connected to line 11 to effect connection of a functional device D29 to line 11.

The control system permits remote control of functional devices. Since the coded signals are conducted over all power lines 10–12 of the system, the transmitters such as transmitter T29 and the associated activate switch such as switch S29 can be connected to a power line 10 in one room of a building and the corresponding receiver R29 and associated functional device D29 can be connected to the same power line or to a different branch of the power line (line 11 as shown in FIG. 1) in a different room of the building. Moreover, in the case of an existing wiring system in which a functional device, such as device D1, is controlled by a transmitter receiver set T1, R1, connected to the same power line 10 and perhaps located in the same room of a building, a further transmitter T1' may include an electrical plug P1, permitting transmitter T1' to be plugged into an outlet, such as outlet G2, connected to power line 12, to provide enabling signals over power lines 10–12 when transmitter T1' is energized. Transmitter T1' is tuned to the same frequency and set to be operable at the same time slot as transmitter T1, and consequently transmitter T1', when activated through the operation of switch S1', effects the generation of signals for enabling receiver R1 which is connected to line 10.

A functional device, such as device D60 can be connected to a line 11 when an associated receiver R60 connected to line 11 is enabled by coded signals provided either by a transmitter T60 connected to line 11 or a transmitter T60' connected to line 12. Both transmitters T60 and T60' are shown permanently wired into the system. Alternatively, the transmitters T60 or T60' could be plugged into outlets G1, G2, etc., permitting the transmitters to be relocated within the wiring system.

A single transmitter, such as transmitter T90, can be used to enable a plurality of receivers, such as receivers R90 and R90', which operate in the same time slot and are tuned to the same frequency to effect operation of a plurality of devices, such as devices D90 and D90', associated with the receivers R90, R90' from one location.

PROTECTIVE FILTER CIRCUITS

The coded signals transmitted over all the branch lines 10–12 are prevented by an RF trap or filter circuit 18 from being transmitted out of the power distribution system in which the coded signals were generated.

The RF trap 18 is connected between the 220 VAC main line 14, 15 which supplies power to the system and the power panel 16 in order to prevent RF signals which may be superimposed on the main line from entering the system or RF signals generated by any of the ninety transmitters from leaving the system via conductors 14, 15. Such a filter network may be provided at the service entry location for the main powerline.

Figure 10:
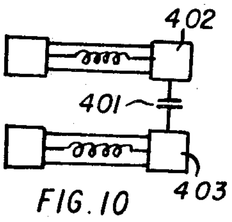
FIGS. 10 and 10*a* are views of power line fuses which include an RF filter circuit for use in the system shown in FIG. 1.
Figure 10A:
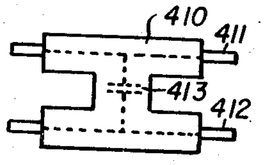

Referring to FIG. 10, the network may comprise a capacitor 401 connected in parallel between fuses 402 and 403 which are serially connected in the main line 14, 15 which provides electrical service to the building. Alternately, a fuse network 410, shown in FIG. 10*a*, includes a pair of fuses 411, 412 each to be connected in series with one of the incoming lines and a capacitor 413 formed as part of the fuse package.

SELF TIMING CIRCUITS

Various modifications of the circuits for the transmitter and receiver units described are possible without departing from the scope of the invention. For instance, it is not necessary to use a sync circuit responsive to the power signals to provide an enabling pulse for a transmitter oscillator or receiver detector stages. Instead, each transmitter and receiver could include a sync circuit operable to generate a sync pulse at periodic intervals to enable the RF oscillator to generate tone bursts when the associated activate switch is operated and to enable the receiver drive circuit to be responsive to the tones transmitted over the power lines. Such sync circuits for each transmitter and receiver of a set would be synchronized with one another such that sync pulses would be provided for both units of the set at the same time.

TIME SLOT EXPANSION

In the described embodiment, each cycle of the power signal was divided into 15 time slots, each approximately 1 millisecond in width. This time division arrangement is used to minimize the number of different enabling tone frequencies, needed to provide numerous unique codings (90 in the described embodiment). By minimizing the number of frequencies used in a given bandwidth, a greater separation between adjacent frequencies (30 Khz in the example) can be obtained.

The number of unique coding combinations for each transmitter-receiver set can be increased without increasing the number of frequencies by decreasing the widths of the time slots (by adjusting resistors 151, FIG. 6 and 351, FIG. 7, in the transmitter sync 22 and receiver sync 32) and allotting further time slots. The time of occurrence of each pulse in the narrower time slots would be changed by decreasing the width of the pulses provided by pulse stretching stages (122, 322) of sync circuits 22 and 32 through the adjustment of resistors 146 and 346.

Alternately, the number of combinations can be increased through time slot expansion in which two cycles of the power signal are used as the time base for triggering the transmitter and receiver sync circuits, such as sync circuits 22 and 32 shown in FIGS. 6 and 7, respectively. In this way 30 time slots, each 1 millisecond in width are provided. This requires addition of a system sync pulse generator 9, shown in FIG 1 having an output connected to power line 12, to provide a reference burst every two cycles. This generator may be connected to any point in the system and would be operative continuously to provide reference signals.

Figure 11:
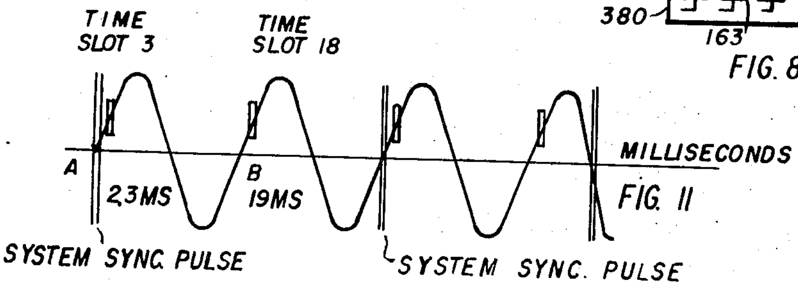
FIG. 11 shows the waveform of a power signal in which a plurality of cycles of the power signal comprise the time base for the system.

Referring to FIG. 11, there is shown a power signal waveform in which the first two cycles A and B of the signal comprise a time base for the system, and tone bursts can be generated during any one of the 30 time slots provided, 15 during each cycle of the power signal. By way of example, tone bursts are shown to be provided in time slots three and 18. Both of the signals are different and are individually detectable by separate transmitter-receiver sets.

The sync circuits 22, 32 (FIG. 6,7) of the transmitter-receiver sets would be modified to respond to the system sync burst rather than zero crossing of the AC waveform, and would be adjusted to be responsive to the first or second cycle of the power signal through the setting of the duration of the one-shot enabling pulses provided by the pulse stretching circuits 122, 322 of the transmit and receive sync circuits, respectively. The time of occurrence of the trailing edge of the pulse determines the time at which the one-shot stages 123 and 327 (FIGS. 6 and 7) of the transmitter T1 and receiver R1 sync circuits 22 and 32 will be enabled to generate a pulse for enabling the transmitter oscillator 20 or the receiver output driver stage 31.

The sync circuit 22 of transmitter T1 can be set to be operable during a time slot of the second cycle of the power signal by increasing the duration of the output of the pulse stretching circuit to exceed the 16.66 millisecond duration of the power signal cycle. For example, if the duration of the pulse is set to be approximately 19 milliseconds, the one-shot 123 of sync circuit 22 would be enabled at the third time slot of the second power signal cycle, to provide the enabling signal for the transmitter oscillator 20. It is pointed out that the pulse stretching circuit 122 is enabled during the first cycle of the power signal responsive to the sync pulse of the system sync generator 9. The pulse stretching circuit, once enabled, will remain turned on during the balance of the first cycle, from 2.3 milliseconds to 16.66 milliseconds after sync burst and for the first three time slots of the second power signal cycle. When the pulse stretching circuit 122 turns off after approximately 19 milliseconds, the one-shot 123 of the sync circuit 22 will be enabled to provide the enable pulse for the transmitter oscillator in the manner described in the discussion of the operation of the transmitter T1.

The sync circuit 32 of the receiver R1 would be set in a similar fashion to provide an enabling pulse for the output drive circuit 31 during the third time slot of the second power signal cycle. To this end, resistor 347 of the pulse stretching circuit 322 of receiver sync circuit 32 would be adjusted such that the pulse stretching circuit, once enabled would remain turned on for slightly less than 19 milliseconds at which time the pulse stretching circuit 322 would turn off thereby enabling the one-shot 323 to provide the enable signal for enabling the receiver drive circuit 31 at the third time slot of the second power signal cycle.

I claim:

1. In a control system for operating functional devices over an electrical power line, said power line having a main line and a plurality of branch lines which conduct AC power signals for operating said functional devices, transmit means for each functional device including signal generating means connected to one of said branch lines and operable when enabled to generate frequency signals for transmission over all of said branch lines and transmit sync means operable during each cycle of the power signals for which the transmit sync means are energized to enable said signal generating means during at least one preassigned time slot relative to a zero crossover of the power signals, and corresponding receive means for each functional device including signal detecting means connected to one of said branch lines and tuned to detect frequency signals generated by the corresponding transmitter means, drive means controlled by said signal detecting means and operable when enabled to effect the connection of associated functional devices to one of said branch lines for operation by said AC power signals, and receive sync means enabled during said preassigned time slot for enabling said drive means, and filter means connected between said main line and said branch lines for preventing the transmission of said frequency signals over said main line.

2. In a control system for operating functional devices over a power line conducting cyclical power signals for operating said functional devices, a plurality of transmit units, each transmit unit having signal generating means, operable when enabled to generate frequency signals for transmission over said power lines, and transmit sync means operable when enabled during each cycle of the power signals for which said transmit sync means are energized to enable said signal generating means during at least one preassigned time slot relative to a zero crossover of the power signal, and a plurality of receive units including a receive unit for each functional device, each receive unit having signal detecting means connected to said power line and tuned to detect frequency signals generated by a corresponding transmit unit, drive means controlled by said signal detecting means and operable when enabled to effect the connection of an associated functional device to said power line for operation by said power signal, and receive sync means enabled during said preassigned time slot for the corresponding unit for enabling said drive means, and reference signal generator means connected to said power line for providing reference signals over said power line for a predetermined number of cycles of said power signals, said transmit and receive sync means being connected to said power line and responsive to said reference signals to provide enable signals for enabling said signal generating means and said drive means, respectively, during said preassigned time slot.

3. A control system as set forth in claim 1 wherein said transmit means includes activate means connected to said power line and operable to energize said transmit sync means.

4. A control system as set forth in claim 1 wherein said transmit sync means include one-shot circuit means for providing an enable pulse of a preselected duration for enabling said signal generating means for said duration.

5. A control system as set forth in claim 4 wherein said one-shot means includes means for selecting the duration of said enable pulse.

6. A control system as set forth in claim 5 wherein said transmit sync means further include sync pulse circuit means for providing a trigger pulse for enabling said one-shot circuit means during said preassigned time slot.

7. A control system as set forth in claim 6 wherein said sync pulse circuit means include limiter means connected to said one branch line and responsive to said power signals to provide a sync pulse, and pulse stretching means responsive to said sync pulse to provide said trigger pulse during said preassigned time slot.

8. A control system as set forth in claim 7 wherein said pulse stretching means include means for preassigning the time slot during which said one-shot means is enabled.

9. A control system as set forth in claim 4 wherein said receive sync means include further one-shot circuit means for providing an enable pulse of said preselected duration for enabling said drive means for the duration that said signal generating means are enabled permitting said drive means to be controlled by said signal detecting means for said duration.

10. A control system as set forth in claim 9 wherein said further one-shot circuit means include means for selecting the duration of said drive means enable pulse to be longer than the duration of said signal generating means enable pulse.

11. A control system as set forth in claim 10 wherein said receive sync means includes sync pulse circuit means connected to one of said branch lines and responsive to said power signals to provide a trigger pulse for enabling said further one-shot circuit means prior to the enabling of said signal generating means.

12. A control system as set forth in claim 1 in which said transmit means further include D.C. power circuit means connected to said one power line branch for deriving an energizing potential for said transmitter sync means and activate switch means operable to connect said transmitter sync means to said D.C. power circuit means.

13. In a control system for operating functional devices over an electrical power line, said power line having a main line and a plurality of branch lines which conduct AC power signals for operating said functional devices, transmit means for each functional device including tone generating means operable when energized to generate tone signals of a predetermined frequency for a selected duration for transmission over all of said branch lines during each cycle of the AC power signals that said tone generating means are energized, and corresponding receive means for each functional device including tone detect means connected to one of said branch lines and tuned to detect tone signals of said predetermined frequency, drive means operable whenever tone signals are detected by said detect means to effect the connection of an associated functional device to one of said branch lines for operation, inhibit means responsive to said tones to inhibit the operation of said drive means whenever the duration for which the tone signals are detected exceeds said selected duration, and filter means connected between said main line and said branch lines for preventing the transmission of said tone signals over said main line.

14. A control system as set forth in claim 13 in which said transmit means further include sync means connected to said one branch line and responsive to said AC power signals to enable said tone generating means for said selected duration and in which said receive means include further sync means connected to said one branch line and responsive to said AC power signals for enabling said drive means only for said selected duration.

15. A control system as set forth in claim 13 in which said receive means includes phase splitting means connected to said tone detect means for conducting a first portion of each cycle of the tone signals to said drive means for operating said drive means, and a second portion of each cycle of the tone signals detected to said inhibit means.

16. A control system as set forth in claim 15 in which said inhibit means comprises switching means and timing means responsive to the second cycle portion of the tone signals detected to enable said switching means to provide a disabling signal for said drive means whenever the duration for which said tone signals are detected exceeds said selected duration.

17. In a control system for operating functional devices over an electrical power line said power line having a main line and a plurality of branch lines which conduct AC power signals for operating said functional devices, transmit means for each functional device including signal generator means operable when enabled to provide frequency signals for transmission over all of said branch lines, and sync means including transmit enable means connected to one of said branch lines and responsive to said power signals to enable said signal generating means at a preassigned time relative to a zero crossover of said power signals, and corresponding receiver means for each functional device including signal detecting means connected to one of said branch lines for detecting frequency signals provided by corresponding transmit means, drive means including timing means controlled by said signal detecting means and operable when enabled to provide a control signal whenever frequency signals are detected by said signal detecting means for a time greater than a predetermined time and switching means responsive to said control signal to effect the connection of an associated functional device to one of said branch lines, and further sync means including receiver enable means connected to said one branch line and responsive to said power signal to enable said timing means at said preassigned time, and filter means connected between said main line and said branch lines for preventing the transmission of said frequency signals over said main line.

18. A control system as set forth in claim 17 in which said timing means includes circuit means for maintaining said switching means operated for a predetermined time after said signal generating means are deenergized.

19. A control system as set forth in claim 17 wherein said switching means include current conducting means operable when enabled to connect said functional device to said one branch line and gating means responsive to said control signal to enable said current conducting means to conduct current from said one branch line to said functional device for operating said device, the magnitude of said current supplied to said functional device being proportional to the width of said control signal.

20. A control system as set forth in claim 19 wherein the width of said control signal is proportional to the duration for which said frequency signals are provided by said signal generating means and wherein said transmit enable means includes means for selecting the duration for which said signal generating means are enabled to thereby determine the magnitude of current supplied to said functional device.

21. In a control system for operating functional devices over an electrical power line, said power line having a main line and a plurality of branch lines for conducting electrical power signals for operating said functional devices, at least one transmit unit connected to one of said branch lines for controlling the operation of said functional devices, said transmit units including signal generating means individually operable when energized to provide frequency signals for transmission over all of said power line branches to effect operation of an associated functional device, and a corresponding receive unit for each functional device including detect means connected to one of said branches for detecting the frequency signals transmitted by the corresponding transmit unit, and drive means controlled by said detect means and responsive to the detection of enable signals to effect the connection of an associated functional device to a branch of said power line, and filter means connected between said main line and said branch lines for preventing the transmission of said frequency signals over said main line.

22. In a control system for operating a plurality of functional devices over an electrical power line for a building, said electrical power line including a main line which extends AC power signals to said building and a plurality of branch lines which conduct the AC power signals to a plurality of different locations in said building for operating said functional devices a plurality of transmitter units and a plurality of receiver units for controlling the operation of associated functional devices, certain ones of said transmitter units being connected to one of said branch lines and certain other ones of said transmitter units being connected to said other branch lines, each transmitter unit including signal providing means operable when energized to provide frequency signals for transmission over all of the branches of said power line during at least one preassigned time slot of a cycle of the power signals, different ones of said transmitter units being enabled to provide said frequency signals during different time slots of a cycle, and each receiver unit including signal detecting means connected to one of the branch lines for detecting said frequency signals, the signal detecting means for each receiver unit being prepared for operation in at least one time slot which is preassigned thereto, and discrete drive means controlled by each of said signal detecting means during time slots preassigned to such receiver units to effect the connection of an associated functional device to one of said branch lines for operation by said AC power signals, and filter means connected between said main line and said branch lines for preventing the transmission of the frequency signals over said main line.

23. A control system as set forth in claim 22 wherein the signal providing means of each transmitter unit includes transmitter sync means for pre-assigning the time slots of said power signals during which an associated transmitter unit is enabled and in which the transmitter sync means for a plurality of said transmitter units are set to enable the associated transmitter units during at least said one time slot.

24. A control system as set forth in claim 23 wherein a plurality of transmitter units assigned to the same time slot provide different frequency signals.

25. A control system as set forth in claim 23 wherein the signal providing means of each transmitter unit further includes signal generating means operable when enabled by the associated transmitter sync means during its pre-assigned time slots to generate signals of a predetermined frequency, at least certain of said transmitter units which are operable in said one time slot being assigned a different signal frequency.

26. A control system as set forth in claim 25 in which a plurality of transmitter units which are operable in said one time slot are assigned the same frequency and at least one of said receiver units operable in said one time slot is set to respond to said same frequency signals whereby a plurality of transmitter units in said control system control the operation of at least one of said receiver units.

27. A control system as set forth in claim 22 wherein each receiver unit further includes receiver sync means for preparing its associated drive means for operation during at least one time slot pre-assigned thereto, and in which a plurality of receiver sync means are prepared to operate in said one time slot.

28. A control system as set forth in claim 27 wherein a plurality of receiver units which are prepared for operation in said one time slot are assigned the same signal frequency whereby such receiver units are responsive to frequency signals provided by at least one of said transmitter units operable in said one time slot and set to provide said frequency signal, whereby a plurality of receiver units in said control system are responsive to signals provided by a singleone of said transmitter units.

29. A control system as set forth in claim 27 wherein the receiver sync means of each receiver unit includes select means adjustable to select at least one of a plurality of time slots at which its associated drive means are enabled.

30. A control system as set forth in claim 27 wherein each of a plurality of receiver sync means which operate in said one time slot are set to respond to different frequencies.

31. A control system as set forth in claim 22 wherein each transmitter unit includes associated switch means individually operable to effect energization of the signal providing means of an associated transmitter unit.

32. A control system as set forth in claim 22 including a plurality of electrical outlets connected to one of said branch lines and wherein certain ones of said transmitter units include plug means permitting said certain transmitter units to be plugged into said electrical outlets to provide said frequency signals over said one branch line.

33. A control system as set forth in claim 22 including a plurality of electrical outlets connected to one of said branch lines and wherein certain ones of said receiver units include plug means permitting said certain receiver units to be plugged into said electrical outlets for detecting said frequency signals conducted over said one branch line.

34. A control system as set forth in claim 22 wherein certain of said functional devices comprise an electrical outlet energized when an associated receiver unit is operated.

35. In a control system for operating a plurality of functional devices over an electrical power line, having a main line and a plurality of branch lines which conducts AC power signals, a plurality of transmitter units and a plurality of receiver units for controlling the operation of associated functional devices, each transmitter unit including signal generating means operable when energized to provide signals of a pre-assigned frequency for transmission over all of said branch lines for enabling a corresponding receiver unit, and transmitter sync means connected to one of said branch lines and responsive to said power signals to enable the signal generating means during at least one pre-assigned time slot relative to a zero crossover of said power signals, different ones of said transmitter units being enabled to provide said frequency signals at different time slots, and each receiver unit including signal detecting means connected to one of said branch lines for detecting said frequency signals in at least one such time slot which is pre-assigned thereto, discrete drive means controlled by each of said signal detecting means and operable when enabled to effect the connection of an associated functional device to one of said branch lines, and receiver sync means connected to said power line and responsive to said AC power signals to enable the drive means of a receiver unit only when pre-assigned frequency signals are provided by corresponding transmitter unit at the time slot pre-assigned to such receiver unit, and filter means connected between said main line and said branch lines for preventing the transmission of said frequency signals over said main line.

* * * * *